June 26, 1956   H. J. HERSEY, JR., ET AL   2,752,003
FILTER WITH CONTINUOUS WEB FILTER MEDIUM
Filed May 22, 1953   3 Sheets-Sheet 3

United States Patent Office 2,752,003
Patented June 26, 1956

2,752,003

FILTER WITH CONTINUOUS WEB FILTER MEDIUM

Henry J. Hersey, Jr., Chatham, N. J., and Leslie Silverman, Dover, Mass.

Application May 22, 1953, Serial No. 356,621

2 Claims. (Cl. 183—61)

The present invention relates to apparatus for the separation of solids and the like from gas and although not limited thereto relates more specifically to the separation of dust or other particles such as droplets, fume and the like from air. In general, the present invention provides a structure for supporting a porous filter medium in the path of a stream of air or gas laden with such particles in such manner that relatively small areas of an endless or continuous web of filter medium may be progressively advanced either continuously or intermittently into an operative zone in the path of the gas. After exposure in this zone each area is moved to another zone where any desired portion of the deposited particles may be removed from the filter medium and the filter medium thereafter may be moved into a zone where it may be subjected to cleaning or other similar treatment to condition it for re-use. Alternatively, in the case of discardable filter media, the used areas may be disposed of with or without removal of a portion of the accumulated particles.

Filters of the general type involved to the present invention may be subjected to use with many different kinds of gases and particles which may be carried by the gas and which it may be desired to separate therefrom. Relatively dry, solid particles may be deposited upon a porous filter medium such as wool felt, and the accumulated deposit may be removed therefrom from time to time by reverse jet cleaning apparatus such as that shown in H. J. Hersey, Jr. Patent No. 2,495,635 granted January 24, 1950 or No. 2,559,428 granted July 3, 1951, for example. In such instances the major portion of the deposit may be periodically removed while the filter remains in continuous operation. In other instances, however, the gas or the particles carried thereby may be moist or oily so as to saturate the filter medium and make it inoperable as a filter. It is desirable in such instances to provide apparatus wherein the filter medium may be subjected to supplemental cleaning and/or drying operations if it is to be re-used.

In other instances it may be desirable to use a low cost filter medium such as paper or other inexpensive felted product which can be discarded after use. The present invention thus makes it possible to handle almost any kind of gas or particles carried thereby and to use a filter medium appropriate for the circumstances which may be cleaned or discarded as desired. The primary advantage of the present apparatus is that under all such circumstances the filter remains in continuous operation and the cleaning, reconditioning or discarding of progressively used areas of the filter medium takes place outside the filter proper.

The apparatus of the present invention consists essentially of a chamber provided with an opening across which successive areas of continuous or endless filter medium may be passed. The dust laden gas is brought to the exposed surface of the filter medium lying over the opening and a lower gas pressure is maintained within the chamber thus causing the gas to flow through the filter medium while depositing the particles suspended therein upon the filter medium. The filter medium may be drawn continuously across the opening or may be moved intermittently if so desired but in any event the movement of the filter medium serves to bring unused areas thereof into operative relationship with the opening while used areas thereof are conducted through cleaning or reconditioning zones if so desired.

It is the object of the present invention to provide in such a filter, a tight seal between all edges of the opening and the filter medium passing thereover as well as to provide for the removal of the accumulation of particles deposited on the filter medium.

Referring now to the drawings in which a preferred but not necessarily the only form of the present invention is disclosed:

Figure 1:
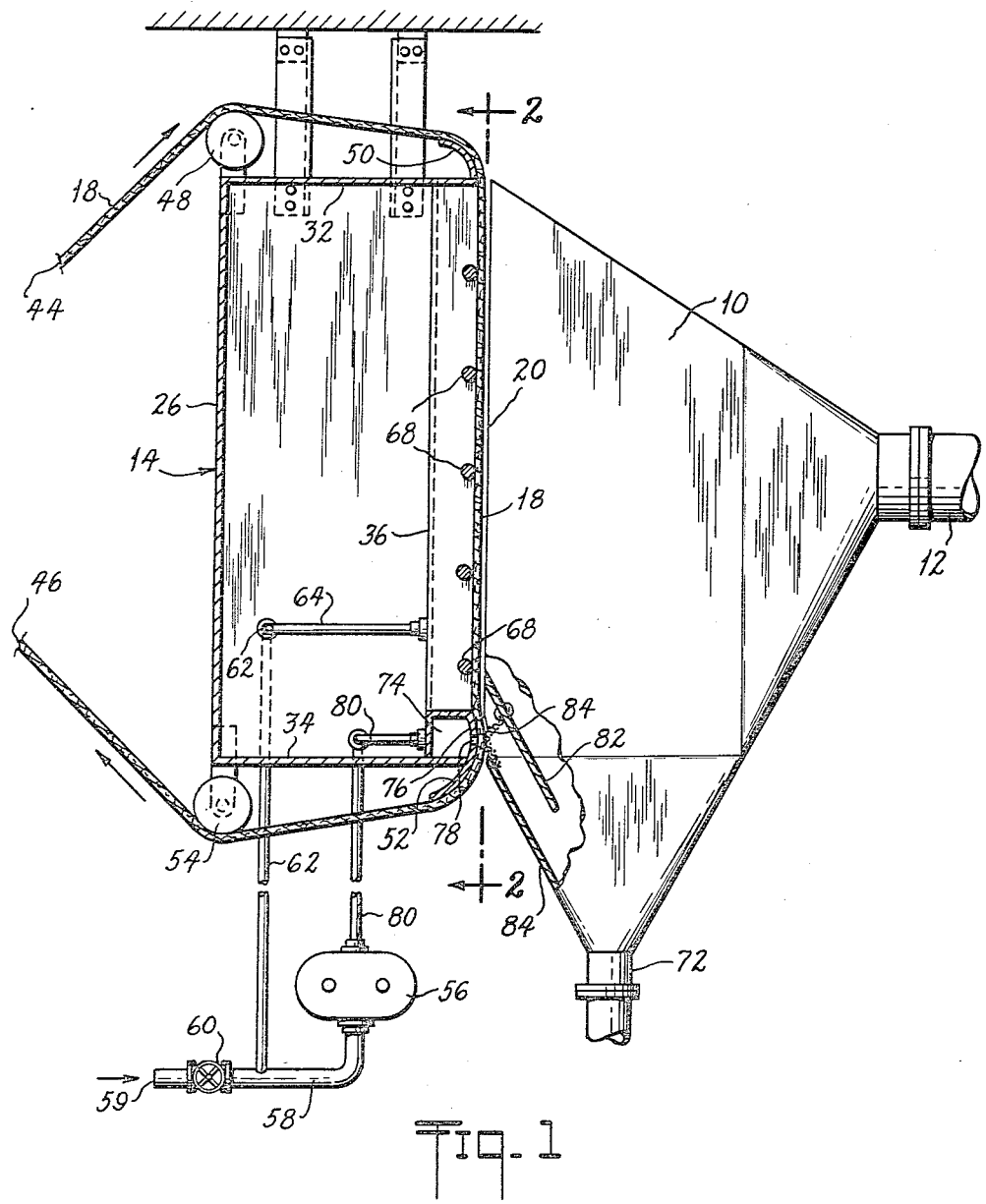
Fig. 1 is a side elevation with parts in section along line 1—1 in Fig. 3, and with other parts broken away, of a filter constructed in accordance with the present invention.

Referring now to the drawings, the filter comprises a plenum 10 to which air or other gas laden with particles of dust, fume, droplets of liquid and the like, may be admitted through an inlet 12. An enclosure indicated generally at 14 is provided with an opening indicated generally at 16 (see Fig. 2) over which there is disposed a portion of the length of a filter medium 18. The plenum 10 is provided with an opening defined by the edge 20 (Fig. 1), 22 (Fig. 2) and other similar edges (not shown), which opening conforms substantially in shape and size to the opening 16 in the enclosure 14. The edges 20, 22, etc., are positioned very close to but preferably out of contact with the adjacent surface of the filter medium 18.

The enclosure 14 is provided with an outlet 24 through which gas may be withdrawn. Preferably the filter shown in the present drawings is operated by a suction fan 25 positioned in a line connected with the outlet 24 to create a low pressure within the enclosure 14 and to draw the particle laden gas into and from the plenum 10 and through the filter medium 18. In this manner the slight leakage of the surrounding atmosphere which will occur along the edges 20, 22, etc., will result merely in only slightly increasing the load upon the suction fan. In other words, there will be no leakage of particles at this point as there would be if a pressure fan were to be used to supply the gas to the plenum 10 and to force it through the filter medium 18.

Figure 2:
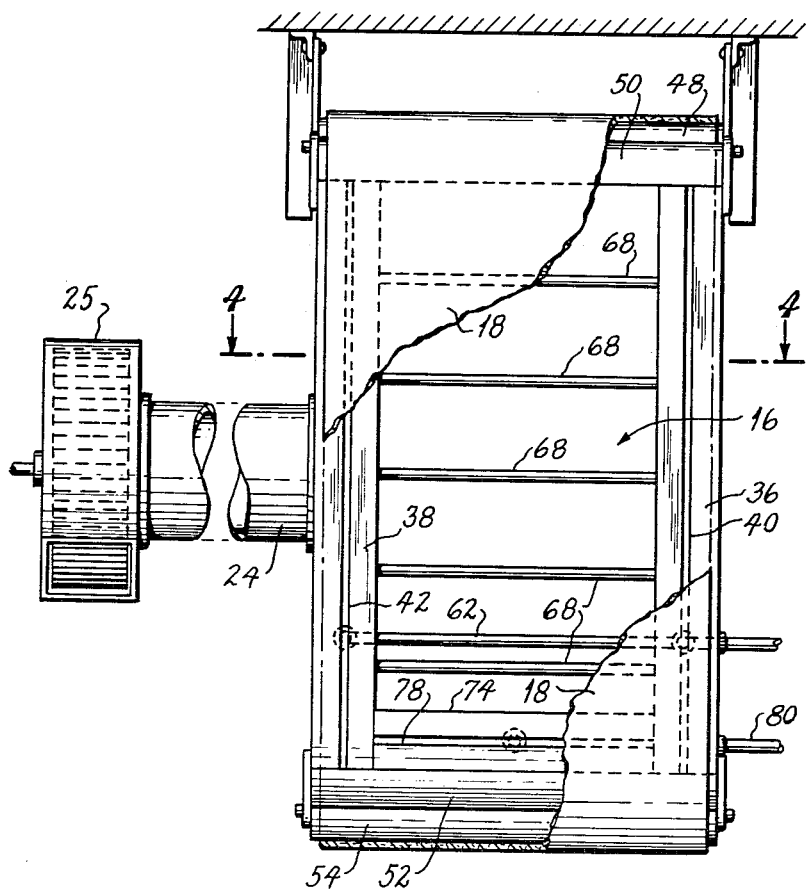
Fig. 2 is a section along the line 2—2 in Fig. 1.

The enclosure 14 may be made of sheet metal or similar material, as desired, and preferably comprises a rear wall 26, side walls 28 and 30 and top and bottom walls 32 and 34. As shown most clearly in Figs. 2 and 4, the front of the enclosure 14 is substantially open and provided along its vertical edges with suction boxes 36 and 38 having slots 40 and 42 formed respectively therein and extending vertically from the top to the bottom of the opening 16. In Fig. 2 it will be apparent that the filter medium 18 is of such width as to extend across the opening 16 with the edges thereof extending beyond the slots 40 and 42.

The filter medium 18 is in the form of an elongated web. In Fig. 1 it is broken away at the points 44 and 46 inasmuch as it may be an endless beltlike structure or alternatively, may be continuous and of indefinite length. In either event, the filter medium 18 enters the apparatus shown in Fig. 1 at the top where it is conducted over a guide roller 48 to a curved plate 50 which terminates along its lower edge within the plane of the slotted front surfaces of the suction boxes 36 and 38. The filter medium 18 is then directed downwardly across the opening 16 to a curved plate 52 similar to the plate 50 just described but located along the lower edge of the apparatus. From the plate 52 the filter medium 18 passes over a lower guide roller 54. The filter medium 18 may be moved through the path just described by any suitable apparatus (not shown) for imparting intermittent or continuous motion thereto, as preferred, in the direction of the arrows in Fig. 1 and for tensioning the web in air-tight contact with the curved plates 50 and 52.

Figure 4:
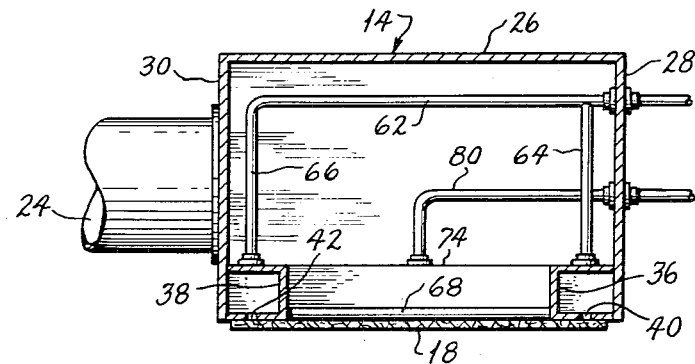
Fig. 4 is a section along the line 4—4 in Fig. 2.

A blower 56 (see Fig. 1) preferably of the positive pressure type, may be mounted in any convenient position relative to the apparatus so far described. The suction side of the blower 56 is provided with an inlet line 58 open at the end 59 to the atmosphere and in which is mounted an adjustable valve 60. Adjustment of the valve 60 may be availed of to establish a predetermined sub-atmospheric pressure within the portion of the line 58 extending from the valve 60 to the inlet of the blower 56. A line 62 enters the line 58 at the point between the valve 60 and the blower 56 and extends into the enclosure 14. As shown in Fig. 4, the line 62 is provided with a branch 64 which is connected with the interior of the suction box 36 and with a branch 66 which connects with the interior of the suction box 38. Thus when the blower 56 is put into operation a sub-atmospheric pressure may be established within the suction boxes 36 and 38 and may be controlled by suitable adjustment of the valve 60 which admits more or less atmospheric air to the end 59 of the line 58.

As will be described hereinbelow the longitudinal edges of the filter medium are made substantially impervious to air along lines which coincide with the suction slots 40 and 42. Thus, the suction created within the boxes 36 and 38 will be effective through the slots 40 and 42 to cause the longitudinal edge portions of the filter medium to press against the front surfaces of the suction boxes 36 and 38. In this manner resistance will be offered against lateral movement of the edge portions across the slots 40 and 42. It will be appreciated that the differential in pressure between the plenum 10 and the interior of the enclosure 14 will tend to bow the filter medium 18 inwardly of the opening 16 and thus to pull the edges thereof toward the center and to cause leakage along the edges. Such action is prevented in the present structure by the provision of the suction boxes 36, 38 and the respective slots 40 and 42 inasmuch as a sufficient force may be exerted along lines extending lengthwise of the slots 40 and 42 to hold the edges of the filter medium 18 flat and tightly sealed against the front surfaces of the suction boxes 36 and 38.

While, as pointed out above, the slots 40 and 42 exert great resistance to lateral movement of the filter medium they will offer relatively little resistance to endwise movement thereof because the slots are narrow as compared with their length.

It is preferred to provide a supporting structure to assist in holding the filter medium flat and to reduce strain on the suction sealed edges thereof. As shown in the drawings such structure may take the form of bars 68 which lie substantially in the plane of the inner surface of the filter medium 18 and which extend transversely of the opening 16. The bars 68 may extend lengthwise of the opening if preferred. Also a screen or a rigid perforated metal plate or other equivalent structure may be employed.

Figure 3:
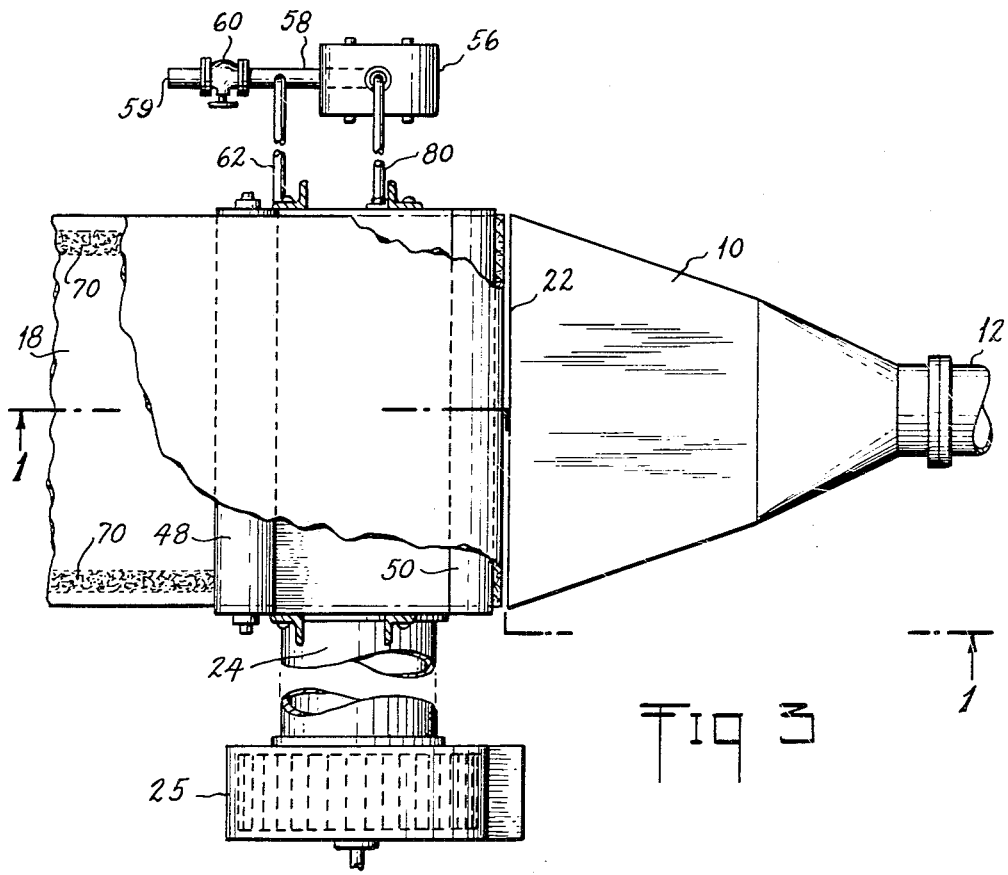
Fig. 3 is a plan view of the device shown in Fig. 1 with certain parts broken away.

As stated above the edge portions of the filter medium 18 are made substantially impervious to air so that a secure seal may be effected with relatively small differential in pressure between the surface of the filter medium and the interior of the suction boxes 36 and 38. In the case of wool felt or paper or the like, it is preferred to apply a layer or strip of relatively impervious flexible material or to impregnate the filter medium with such a material along the edges thereof or at least in the zone which will pass in front of the slots 40 and 42. Thus in Fig. 3 we have indicated longitudinally extending zones 70 adjacent the edges of the filter medium 18 to which such a layer or impregnant may be applied. It will be noted that the zones 70 are aligned with the slots 40 and 42. Impervious paper or cloth tape may be adhesively secured or stitched within the zones 70. Obviously instead of sharply defined zones indicated in Fig. 3 the edge portions of the filter medium may be rendered impervious by dipping the same in a suitable impregnating or coating material such as waxes, varnishes, rubber compounds or emulsions and the like. Such materials may be applied as coatings or impregnants as desired. In any event the zones 70 should have such low porosity as to insure against leakage of particles therethrough to avoid entry of such particles into the blower 56.

In addition to the novel structure for sealing the edges of a longitudinally movable filter medium the illustrated embodiment includes a cleaning device which may be incorporated if so desired. Referring particularly to Fig. 1, it will be observed that the plenum 10 is provided with a tapered lower portion which terminates in an outlet 72. Particles carried in a gas introduced into plenum 10 will fall to the bottom of the plenum 10 to accumulate therein or in a suitable hopper located beneath the outlet 72. Such solids may fall from the gas itself or may drop from the surface of the filter medium 18 when a layer of sufficient thickness has been formed thereon as is well known in the filter art. In the present invention it is contemplated that the filter medium will be moved progressively or intermittently in a downward direction and it may be desired to remove therefrom a substantial portion of the accumulated layer of solids in order that they may be collected at the bottom of the plenum 10. If such is desired there may be incorporated across the lower edge of the opening 16 a reverse jet cleaning device to which air or other cleaning gas is supplied under pressure to form a jet to dislodge from the filter medium a major portion of the accumulated solids thereon. Thus there is provided a pressure or blow tube 74 extending transversely of the opening 16 and having a front wall 76 in which is formed a transversely extending orifice or slot 78. Preferably the front wall 76 of the pressure box 74 is curved to merge with the curvature of the lower plate 52 whereby the filter medium is caused to follow a curved path with the outer surface thereof somewhat elongated as it passes over the orifice 78 to facilitate the dislodgement therefrom of the accumulated particles in accordance with the principles set forth in Patent No. 2,495,635 to H. J. Hersey, Jr.

The positive pressure blower 56 will supply air under pressure to a line 80 extending into the enclosure 14 and communicating with the interior of the pressure box 74. The air thus supplied will be discharged at relatively high velocity through the orifice 78 and through the filter medium 18 for the purpose of dislodging the accumulation of particles therefrom as described above.

In order to prevent redeposit of the solids thus dislodged upon other areas of the filter medium and to assist in conducting such solids to the accumulation zone of the plenum 10, a baffle 82 may be positioned within the plenum 10. The baffle 82 preferably extends from a position somewhat above that of the orifice 78 to a position well below the same. The baffle 82 thus defines a relatively quiet zone into which the dislodged material may be discharged and through which it may fall toward the lower portion of the plenum 10. The zone thus defined is isolated from the main body of gas flowing toward the filter medium 18 and consequently there is little likelihood of the dislodged particles being redeposited upon the filter medium 18.

Also, if so desired, the device of the present invention may have incorporated in it a foraminous brushing element which stretches transversely of the filter medium in a zone adjacent the discharge of the reverse jet orifice 78. As pointed out in Patent No. 2,689,020 granted September 14, 1954, to H. J. Hersey, Jr., it is preferred that the brushing element be made of woven wire screen similar to or identical with that customarily used in the screening of windows. Ordinary copper or bronze screening is well adapted for the purpose. Such a brushing element may be arranged to distribute the accumulated solids into a layer of substantially uniform thickness, just prior to action of the reverse jet thereon. Alternatively, as explained in said application, the brushing element may be arranged to engage the layer directly opposite the orifice in which event a very much greater percentage of the solids will be dislodged by the jet.

In the present structure a brushing element 84 made of woven screening may be secured to the baffle 82 in such manner as to bear flatwise against the accumulating of particles on the filter medium 18. The inherent springiness of woven copper or bronze screening may be availed of to urge it toward the filter medium and to this end the brushing element 84 is preferably sprung in place as shown in Fig. 1. A particular advantage of wire screening is that the action of the jet in dislodging solids will serve also to clean the screen and prevent it from becoming clogged inasmuch as the jet of cleaning air and entrained solids will pass freely through the mesh of the screen.

Obviously other, or additional, means may be provided for cleaning or reconditioning the web of filter medium 18 when a re-usable material is employed. Thus vacuum nozzles, brushes or scrapers may be suitably arranged to operate upon the web. Also the web may be dried by heat or air blast or it may be washed in water or suitable solvent liquids. When a disposable filter web is used the solids may be recovered if desired by the use of the apparatus disclosed after which the used web is discarded.

In the embodiment of the invention chosen for illustration in the drawings, all of the edges 20 and 22 of the plenum 10 are spaced from the filter medium 18, thus making the plenum 10 and the chamber 14 entirely separate structures. This arrangement offers certain specific advantages as, for example, the fact that endless web filter mediums may be applied to and removed from the apparatus with great facility. However, it should be noted that the vertically disposed edges 20 of the plenum 10 can be extended forwardly into sealing engagement with the chamber 14 as, for example, with the opposed exterior surfaces of the side walls 28 and 30 thereof. Alternatively, suitable detachable sealing strips may be bridged across the spaces between the vertical edges 20 and the side walls of the chamber 14. It is essential, however, that the transversely extending upper and lower edges 22 of the plenum 10 be slightly spaced from the surface of the filter medium 18 as will be apparent from an inspection of Figs. 1 and 3.

There has been described above a preferred form of the present invention. Such description has been detailed but it is understood that the details have been presented in a descriptive rather than in a limiting sense. It further will be understood that various features of the disclosure herein may be used independently of the particular combination in which they have been illustrated.

We claim:

1. In a filter for separating particles from a gas the combination of means defining a generally rectangular opening; suction boxes disposed along two opposite edges of said opening, each of said suction boxes having a relatively narrow elongated orifice extending substantially the full length of said edges; a filter medium in the form of an elongated web having a central longitudinal zone pervious to gas and longitudinal edge zones relatively impervious to gas, said web being of such width that the said impervious edge zones thereof may overlie the orifices in said suction boxes while the pervious longitudinal central zone thereof covers said rectangular opening; guide plates disposed along the remaining opposite edges of said rectangular opening, said guide plates being curved about axes extending transversely of the width of said web and serving to guide successive portions of the length of said web over said opening with said impervious edge zones thereof overlying the orifices in said suction boxes; means for exhausting air from said suction boxes to seal said impervious edge zones of said web against said suction boxes; means for conducting particle-laden gas to one surface of the portion of said filter medium covering said rectangular opening under gaseous pressure greater than that on the opposite surface thereof; the curved guide plate over which said web passes in leaving said rectangular opening having formed therein a narrow orifice extending transversely of and over the full width of said web in a position such as to direct a narrow jet of air through said filter medium in a direction opposite to the flow of particle-laden gas to dislodge accumulated solids from successive portions of said filter medium as the same passes through the curved path established by said curved guide plate; and means for supplying air under pressure to said orifice.

2. In a filter for separating particles from a gas the combination of means defining a generally rectangular opening; suction boxes disposed along two opposite edges of said opening, each of said suction boxes having a relatively narrow elongated orifice extending substantially the full length of said edges; a filter medium in the form of an elongated web having a central longitudinal zone pervious to gas and longitudinal edge zones relatively impervious to gas, said web being of such width that the said impervious edge zones thereof may overlie the orifices in said suction boxes while the pervious longitudinal central zone thereof covers said rectangular opening; guide plates disposed along the remaining opposite edges of said rectangular opening, said guide plates being curved about axes extending transversely of the width of said web and serving to guide successive portions of the length of said web over said opening with said impervious edge zones thereof overlying the orifices in said suction boxes; means for exhausting air from said suction boxes to seal said impervious edge zones of said web against said suction boxes; means for conducting particle-laden gas to one surface of the portion of said filter medium covering said rectangular opening under gaseous pressure greater than that on the opposite surface thereof, said last named means including a plenum having a rectangular opening substantially congruent with said first-named rectangular opening, the edges of said plenum opening being disposed in close proximity to but out of contact with said surface of said filter medium; the curved guide plate over which said web passes in leaving said rectangular opening having formed therein a narrow orifice extending transversely of and over the full width of said web in a position such as to direct a narrow jet of air through said filter medium in a direction opposite to the flow of particle-laden gas to dislodge accumulated solids into said plenum from successive portions of said filter medium as the same passes through the curved path established by said curved guide plate; means for supplying air under pressure to said orifice; and a baffle in said plenum for directing particles dislodged from said filter medium away from the current of particle-laden gas conducted to said filter medium.

References Cited in the file of this patent

UNITED STATES PATENTS

| | | |
|---|---|---|
| 1,814,428 | Bishop | July 14, 1931 |
| 1,949,002 | Annis | Feb. 27, 1934 |
| 1,982,639 | Christofferson | Dec. 4, 1934 |
| 2,016,991 | Dollinger | Oct. 8, 1935 |
| 2,216,986 | Roe | Oct. 8, 1940 |
| 2,516,680 | Culpepper | July 25, 1950 |